3,217,058
PREPARATION OF ALPHA-OLEFINS FROM
ALUMINUM ALKOXIDES
Mack W. Hunt, Ponca City, Okla., assignor to Continental Oil Company, Ponca City, Okla., a corporation of Delaware
No Drawing. Filed Nov. 2, 1961, Ser. No. 149,514
3 Claims. (Cl. 260—682)

This invention relates to a novel method of producing high molecular weight alpha-olefins, and more particularly, it pertains to the preparation of such alpha-olefins from a growth product which is obtained by reacting a low molecular weight aluminum trialkyl with a low molecular weight mono-olefin.

The growth reaction is an economical procedure for building the length of hydrocarbon chains. The method involves thermally reacting aluminum trialkyl of low molecular weight with a low molecular weight mono-olefin to produce a growth product of relatively high molecular weight. The growth product may serve as a starting material for the production of various other materials such as alcohols, alpha-olefins, etc. The alpha-olefins are valuable commercially, consequently, it is important to devise effective means for their production.

Accordingly, an object of this invention is to provide a method of producing alpha-olefins from growth product.

Another object of this invention is to produce alpha-olefins by a method which results in the production of valuable alumina by-product material.

Other objects and advantages of this invention will become apparent from the following description and explanation thereof.

In accordance with the present invention, an aluminum trialkoxide having alkoxide groups containing about 2 to 40 carbon atoms is heated at a temperature of about 175° C. to 450° C. to produce alpha-olefins containing 2 to 40 carbon atoms and alumina by-product material.

The aluminum trialkoxide is prepared by the oxidation of a growth product. In turn, the growth product is obtained by reacting a low molecular weight trialkyl having the alkyl groups containing about 2 to 4 carbon atoms and a low molecular weight mono-olefin containing about 2 to 4 carbon atoms. The aluminum trialkyl starting material may be, for example, aluminum triethyl, aluminum tripropyl, aluminum tributyl, etc. The low molecular weight mono-olefin may be, for example, ethylene, propylene, butylene, etc. The reaction between the aluminum trialkyl and the mono-olefin may be conducted at a temperature of about 65° to 150° F., more usually about 90° to 120° F., and at a pressure of about 200 to 5000 p.s.i.g., more usually about 1000 to 3000 p.s.i.g. The relative quantities of aluminum trialkyl and mono-olefin are selected on the basis of providing a statistical addition of the desired number of moles of mono-olefin to the alkyl substituents of the aluminum tri-alkyl. For this purpose, in general about 3 to 52 moles of mono-olefin are reacted with each mole of aluminum trialkyl. The reaction may be effective in the presence of a diluent such as a paraffin, cycloparaffin, aromatic hydrocarbon, etc. In particular, the diluent may be isooctane, benzene, xylene, and the like. The diluent serves to control the temperature of the growth reaction and also to facilitate the handling of the growth product by virtue of its solvent action. The growth product has alkyl substituents which contain about 2 to 40 carbon atoms, and is designated, for the purpose of this specification and claims, as a high molecular weight trialkyl.

The growth product is subjected to an oxidation treatment to convert the same to the corresponding aluminum trialkoxide. The oxidation reaction is effected by means of an oxygen containing gas, such as for example, oxygen, air, etc. Generally, about 10 to 50 moles, more usually about 15 to 25 moles of oxygen containing gas, per mole of high molecular weight trialkyl are employed in the oxidation treatment. The oxidation reaction may be conducted at a temperature of about 5° to 200° C., more usually about 20° to 100° C. and at a pressure of about 5 to 100 p.s.i.g., more usually about 10 to 60 p.s.i.g. It should be understood, however, that other conditions of temperature and pressure may be employed in the oxidation treatment without departing from the scope of the present invention.

The high molecular weight aluminum trialkoxide is then subjected to a heat treatment for the production of high molecular weight alpha-olefins. In this regard, the aluminum trialkoxide is heated to a temperature of about 175° to 450° C., at which it decomposes to produce alpha-olefins, aluminum oxide and water in accordance with the following equations:

(1)

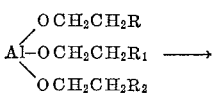

$$Al(OH)_3 + RCH=CH_2 + R_1CH=CH_2 + R_2CH=CH_2$$

wherein R, $R_1$ and $R_2$ are alkyl groups.

(2)

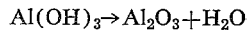

$$Al(OH)_3 \rightarrow Al_2O_3 + H_2O$$

More usually, the temperature of decomposition may be about 200° to 350° C. The heating operation may be conducted for a period of about 1 to 10 hours, and more usually 1 to 3 hours. The reaction may be conducted at subatmospheric, atmospheric or superatmospheric pressure. It is preferred to use atmospheric pressure or slightly above atmospheric pressure in the reaction.

The yield of alpha-olefin in the thermal decomposition of aluminum trialkoxide may be enhanced substantially by the use of an inert gaseous material or by the use of a material which will form carbonates in the decomposition of the aluminum trialkoxide. The inert gaseous material may include argon, nitrogen, a low molecular weight normally gaseous hydrocarbon such as methane, ethane, propane, etc. The use of carbon dioxide, which will form carbonates with the aluminum trialkoxide, also results in a higher yield of alpha-olefins than is obtained without the same. The inert gaseous material or carbon dioxide may be introduced directly into the aluminum trialkoxide or it may be passed in gaseous form, over the surface of the decomposition or reaction liquid. The latter method of introduction is suited to a material which is normally gas or one which may be rendered gaseous through heating and the like. The passage of gaseous material over the surface of the decomposition or reaction liquid may occur throughout the period of reaction. However, if desired, the passage of material may be discontinued before the end of the reaction, although a reduction in yield will result. The amount of inert gas or carbon dioxide employed in the reaction is sufficient to keep a blanket or atmosphere of gaseous material above the surface of the decomposition liquid. For this purpose, any amount up to and including an excess of 3 moles of carbon dioxide per mole of aluminum alkoxide may be passed as a continuous stream into the gaseous zone above the reaction liquid.

To illustrate further the present invention, reference will be had to the following examples.

*Example 1*

Growth product was prepared by reacting ethylene with aluminum triethyl in kerosene at a temperature of 248° F.

and a pressure of 1500 p.s.i.g. for 157 minutes. The resulting growth product was oxidized with air at 90° F. and a pressure of 40 p.s.i.g. for 3 hours and 36 minutes. The oxidized growth product was spray stripped in two passes at 500° F. to remove volatile solvent and by-products.

50 gm. of the growth product (aluminum trialkoxide) was placed in a suitable flask equipped with a distillation column. The material in the flask was heated rapidly to 325° C. and a colorless liquid was yielded overhead from the distillation column. The final temperature of the reaction mass in the flask was 340° C. A total of 39.1 of gm. of colorless liquid was collected. By analysis, the colorless liquid was found to be 62% alpha-olefin and the remainder constituted beta and gamma olefins with traces of normal saturated hydrocarbons.

*Example 2*

The procedure in Example 1 was repeated except that a stream of nitrogen was passed slowly over the surface of the reaction mass in the flask during the heating period. At a flask temperature of 290° C., the alpha-olefins were yielded overhead from the distillation column. A total of 40.8 gm. of colorless liquid was collected. By analysis, it was determined that a yield of 68% of alpha-olefins was obtained.

*Example 3*

The procedure of Example 2 was repeated except that $CO_2$ was employed instead of nitrogen. The flask temperature was 220° C. when a colorless overhead product from the distillation column was obtained. The colorless liquid was analyzed to contain about 75% alpha-olefins.

A comparison on Example 1 with either of Examples 2 and 3 demonstrates the superiority of using an inert gas and carbon dioxide in the thermal decomposition of aluminum trialkoxides.

I claim:

1. A process which comprises subjecting an aluminum trialkoxide having alkoxide groups containing from about 2 to 40 carbon atoms in a protective atmosphere of a gas selected from the group consisting of inert gases and carbon dioxide to a temperature of about 175° to 450° C. for a period sufficient to decompose the trialkoxide and thereby produce alpha-olefins.

2. A process which comprises reacting an aluminum trialkyl having alkyl groups containing about 2 to 4 carbon atoms with a mono-olefin containing about 2 to 4 carbon atoms to produce a growth product having alkyl substituents containing about 2 to 40 carbon atoms, oxidizing the growth product by means of an oxygen containing gas to produce the corresponding aluminum trialkoxide, and subjecting the aluminum trialkoxide in a protective atmosphere of a gas selected from the group consisting of inert gases and carbon dioxide to heat at a temperature of about 175° C. to about 450° C. to cause the aluminum trialkoxide to decompose and thus producing alpha-olefins, alumina and water.

3. The process of claim 2 wherein the aluminum trialkyl is aluminum triethyl and the mono-olefin is ethylene.

References Cited by the Examiner

UNITED STATES PATENTS 2,863,896   12/58   Johnson _____ 260—683.15
2,892,858   6/59    Ziegler _____ 260—448

FOREIGN PATENTS 178,626     11/53   Austria.
1,242,595   12/59   France.
878,146     9/61    Great Britain.

OTHER REFERENCES

Meerwein et al.: Thermal Decomposition of Metallic Alcoholates and Ortho Esters, Journal furpraktische Chemie, vol. 147, pages 203–210 relied on, (1936).

DELBERT E. GANTZ, *Primary Examiner.*

ALPHONSO D. SULLIVAN, *Examiner.*